United States Patent
Park et al.

(10) Patent No.: US 10,082,627 B2
(45) Date of Patent: Sep. 25, 2018

(54) APPARATUS AND METHOD FOR PROVIDING TERAHERTZ WAVES

(71) Applicant: Electronics and Telecommunications Research Institute, Daejeon (KR)

(72) Inventors: Kyung Hyun Park, Daejeon (KR); Il Min Lee, Daejeon (KR); Eui Su Lee, Daejeon (KR); Ho Jin Lee, Daejeon (KR); Sang Pil Han, Daejeon (KR); Hyun Soo Kim, Daejeon (KR); Ki Won Moon, Daejeon (KR); Dong Woo Park, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/808,640

(22) Filed: Nov. 9, 2017

(65) Prior Publication Data

US 2018/0136397 A1    May 17, 2018

(30) Foreign Application Priority Data

Nov. 15, 2016  (KR) .................. 10-2016-0151688
Sep. 27, 2017  (KR) .................. 10-2017-0125250

(51) Int. Cl.
   *G02B 6/26*   (2006.01)
   *G02B 27/09*  (2006.01)

(52) U.S. Cl.
   CPC .......... *G02B 6/262* (2013.01); *G02B 6/264* (2013.01); *G02B 27/0927* (2013.01); *G02B 27/0944* (2013.01)

(58) Field of Classification Search
   CPC ..... G02B 6/262; G02B 6/264; G02B 27/0927
   See application file for complete search history.

(56) References Cited

U.S. PATENT DOCUMENTS

| | | | |
|---|---|---|---|
| 6,747,736 B2 | 6/2004 | Takahashi | |
| 7,194,184 B2 | 3/2007 | Buelow, II et al. | |
| 7,239,777 B1* | 7/2007 | Christensen | G02B 6/032 359/349 |
| 7,787,724 B2* | 8/2010 | Creeden | G02B 6/10 359/326 |
| 7,933,524 B2 | 4/2011 | Park et al. | |
| 8,064,740 B2* | 11/2011 | Sartorius | H04B 10/5051 385/14 |

(Continued)

FOREIGN PATENT DOCUMENTS

KR    1020130001805 A    1/2013

*Primary Examiner* — Daniel Petkovsek
(74) *Attorney, Agent, or Firm* — William Park & Associates Ltd.

(57) ABSTRACT

An apparatus providing a terahertz (THz) wave may comprise at least one THz wave generator each of which generates a THz wave; at least one first phase adjuster adjusting a phase of the generated THz wave; at least one waveguide part receiving and combining the at least one phase-adjusted THz wave radiated from the at least one first phase adjuster, and guiding the combined THz wave; at least one second phase adjuster adjusting a phase of the combined THz wave from the at least one waveguide part, which is connected to the at least one waveguide part or disposed in a portion of the at least one waveguide part; and an output module outputting the THz wave guided from the at least one waveguide part.

11 Claims, 4 Drawing Sheets

(56) References Cited

U.S. PATENT DOCUMENTS

| | | | |
|---|---|---|---|
| 8,433,170 B2* | 4/2013 | Cooke | G02F 1/353 |
| | | | 385/129 |
| 8,481,945 B2* | 7/2013 | Koyama | G02F 1/353 |
| | | | 250/341.1 |
| 8,488,640 B2* | 7/2013 | Peters | H04J 14/0221 |
| | | | 372/26 |
| 8,599,893 B2 | 12/2013 | Kim et al. | |
| 9,196,940 B2* | 11/2015 | Brown | H01P 1/182 |
| 9,354,484 B2* | 5/2016 | Kim | G02F 1/353 |
| 2011/0149368 A1* | 6/2011 | Kim | G02F 1/3534 |
| | | | 359/276 |
| 2012/0147907 A1* | 6/2012 | Kim | H01S 5/06258 |
| | | | 372/4 |

* cited by examiner

US 10,082,627 B2

APPARATUS AND METHOD FOR PROVIDING TERAHERTZ WAVES

CROSS-REFERENCE TO RELATED APPLICATIONS

This application claims priorities to Korean Patent Applications No. 10-2016-0151688 filed on Nov. 15, 2016 and No. 10-2017-0125250 filed on Sep. 27, 2017 in the Korean Intellectual Property Office (KIPO), the entire contents of which are hereby incorporated by reference.

BACKGROUND

1. Technical Field

The present disclosure relates to an apparatus and a method for providing terahertz waves, and more specifically, to an apparatus and a method for providing terahertz waves by controlling phase distribution and intensity distribution of the terahertz waves.

2. Related Art

Terahertz (THz) wave is an electromagnetic wave whose frequency is ranged from 0.1 THz to 10 THz. The THz wave has a property of transmitting non-polar polymer material and thus may be used for a non-destructive inspection such as penetration of paper, paint, plastic, tile, etc. In particular, the THz wave has an advantage that the photon energy is lower than the ionization energy of material, and thus does not cause harm to the human body. Also, since the THz wave has higher frequency than commonly used microwave or radio wave, it has an advantage that a resolution higher than those of the radio waves can be obtained when the THz wave is used for imaging.

Apart from THz radiation which is only partially obtained in nature, a THz wave generator, usually referred to as a THz light source, is needed to artificially obtain a THz wave. Various apparatuses such as a free electron laser (FEL), a gyrotron, and a plasma generator are used to obtain a high power THz wave. However, since such the high power generator is large in size and requires a large amount of energy, its practicality is very low.

Another method widely used for a more efficient and compact THz wave generation is to apply a pulsed light of a pulsed laser to a semiconductor material to obtain a THz wave in a form of a pulsed wave. However, size, price, and unstabilization of such method also limit the daily use of THz waves.

As another method, there are various methods using semiconductor devices. In general, there are a photomixing method in which two laser beams emitted from semiconductor devices are applied to another semiconductor material (usually a photomixer) having a high conversion efficiency so as to obtain a THz wave output, and a method of using a resonant tunneling diode (RTD), a high electron mobility transistor (HEMT), or the like as a direct THz generator.

Such the semiconductor-based generator can be implemented at a low cost and is very small in size so that it is suitable for various application fields. However, since they have a relatively low power, it is required to improve the output power of them. This is a problem that can be solved if an amplifier of the THz wave band is available, but amplification technology which has high practicality in the THz wave band has not yet been developed.

SUMMARY

Accordingly, embodiments of the present disclosure provide a THz wave providing apparatus for providing a THz wave by controlling phase distribution and intensity distribution thereof.

Accordingly, embodiments of the present disclosure also provide a THz wave providing method for providing a THz wave by controlling phase distribution and intensity distribution thereof.

In order to achieve the objective of the present disclosure, an apparatus providing a terahertz (THz) wave may comprise at least one THz wave generator each of which generates a THz wave; at least one first phase adjuster adjusting a phase of the generated THz wave; at least one waveguide part receiving and combining the at least one phase-adjusted THz wave radiated from the at least one first phase adjuster, and guiding the combined THz wave; at least one second phase adjuster adjusting a phase of the combined THz wave from the at least one waveguide part, which is connected to the at least one waveguide part or disposed in a portion of the at least one waveguide part; and an output module outputting the THz wave guided from the at least one waveguide part.

Output intensity distribution and phase distribution of the output THz wave may be controlled by the at least one waveguide part and the at least one second phase adjuster.

At least a portion of the at least one waveguide part may be positioned on a horn antenna or a lens that receives the at least one phase-adjusted THz wave.

The at least one second phase adjuster may include at least one unevenness formed by etching or attaching in the at least one waveguide part.

The at least one waveguide part may include a first cylindrical waveguide and a second cylindrical waveguide surrounding the first cylindrical waveguide, and the first cylindrical waveguide and the second cylindrical waveguide may have a same center.

The first cylindrical waveguide may include at least one window to guide a THz wave guided via the first cylindrical waveguide to the second cylindrical waveguide through the window.

The second cylindrical waveguide may perform a rotational reciprocating motion or a unidirectional rotational motion within a certain angle.

The output module may include at least one of an antenna, a lens, and an aperture to output the THz wave in a form of a Gaussian beam or a line beam.

In order to achieve the objective of the present disclosure, an apparatus providing a terahertz (THz) wave may comprise a THz wave generating module generating at least one THz wave; a combining module combining the at least one THz wave by controlling phase distribution and intensity distribution of the at least one THz wave radiated from the THz wave generating module, and guiding the combined THz wave through at least one waveguide part; and an output module outputting the THz wave guided from the combining module.

The combining module may include a horn antenna receiving the at least one THz wave radiated from the THz wave generating module.

The combining module may include at least one waveguide part.

The combining module may further include at least one phase adjuster which is connected to the at least one waveguide part or disposed in at least a portion in the at least one waveguide part.

The at least phase adjuster may include at least one unevenness formed by etching or attaching in the combining module or the at least one waveguide part.

The at least one waveguide part may include a first cylindrical waveguide and a second cylindrical waveguide surrounding the first cylindrical waveguide, and the first cylindrical waveguide and the second cylindrical waveguide may have a same center.

The first cylindrical waveguide may include at least one window to guide a THz wave guided via the first cylindrical waveguide to the second cylindrical waveguide through the window.

The second cylindrical waveguide may perform a rotational reciprocating motion or a unidirectional rotational motion within a certain angle.

The output module may include at least one of an antenna, a lens, and an aperture to output the THz wave in a form of a Gaussian beam or a line beam.

In order to achieve the objective of the present disclosure, a method for providing a terahertz (THz) wave may comprise generating at least one THz wave; primarily adjusting a phase of each of the at least one THz wave; receiving and combining the at least one primarily phase-adjusted THz wave and secondarily adjusting a phase of the combined THz wave by using at least one waveguide part and at least one phase adjuster, so as to control phase distribution and output intensity distribution of the combined THz wave; controlling a profile and a direction of a THz wave beam through a rotational motion of at least one waveguide included in the at least one waveguide part; and outputting the THz wave beam.

The at least one waveguide part may include a first cylindrical waveguide and a second cylindrical waveguide surrounding the first cylindrical waveguide, and the first cylindrical waveguide and the second cylindrical waveguide may have a same center.

The second cylindrical waveguide may perform a rotational reciprocating motion or a unidirectional rotational motion within a certain angle.

According to the embodiments of the present disclosure as described above, it is made possible to overcome the low power problem, which is the disadvantage of the conventional THz wave generator, and to obtain a uniform beam, so that the THz wave can be used for imaging and the like.

The embodiments of the present disclosure are also expected to be widely applicable to various THz wave applications by enabling output of a beam having a specific profile.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
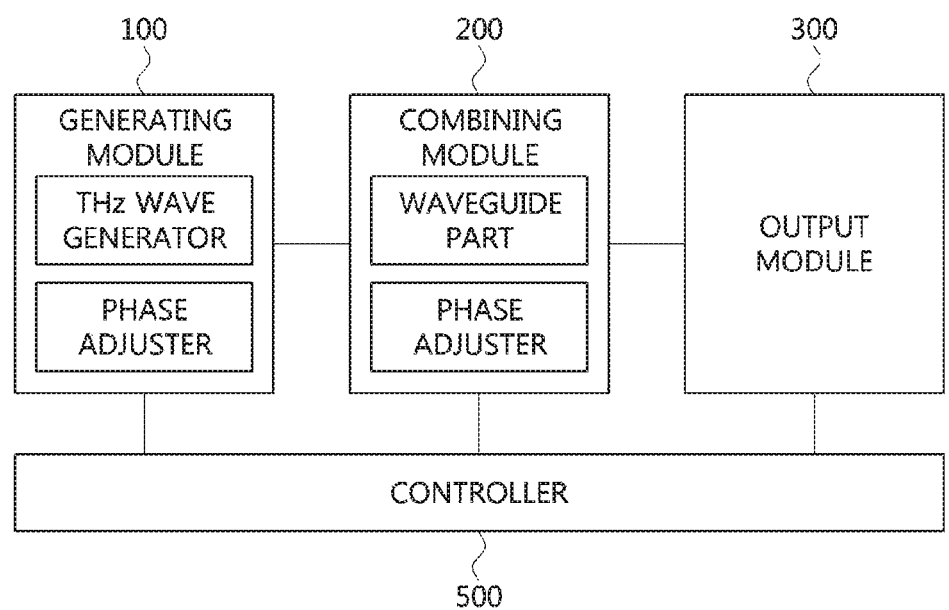
FIG. 1 is a schematic block diagram of a THz wave providing apparatus according to an embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings.

FIG. 1 is a schematic block diagram of a THz wave providing apparatus according to an embodiment of the present disclosure.

Referring to FIG. 1, a THz providing apparatus according to an embodiment of the present disclosure may comprise a generating module 100, a combining module 200, and an output module 300.

The generating module 100 may include at least one THz wave generator and at least one phase adjuster so as to generate at least one THz wave.

The combining module 200 may include at least one waveguide part and at least one phase adjuster, combine the at least one THz wave by adjusting phase distribution and intensity distribution of the at least one THz wave radiated from the generating module 100, and guide the combined THz wave through the at least one waveguide part. Also, the at least one waveguide part may be movable.

The output module 300 may then output the THz wave guided from the combining module to the outside.

Meanwhile, a controller 500 connected to the generating module 100, the combining module 200, and the output module 300 may control the at least one THz wave generator, the at least one phase adjuster, the at least one movable waveguide part, and the like so that the THz wave providing apparatus according to the present disclosure provides a THz wave having a desired optimum intensity distribution and phase distribution.

Figure 2:
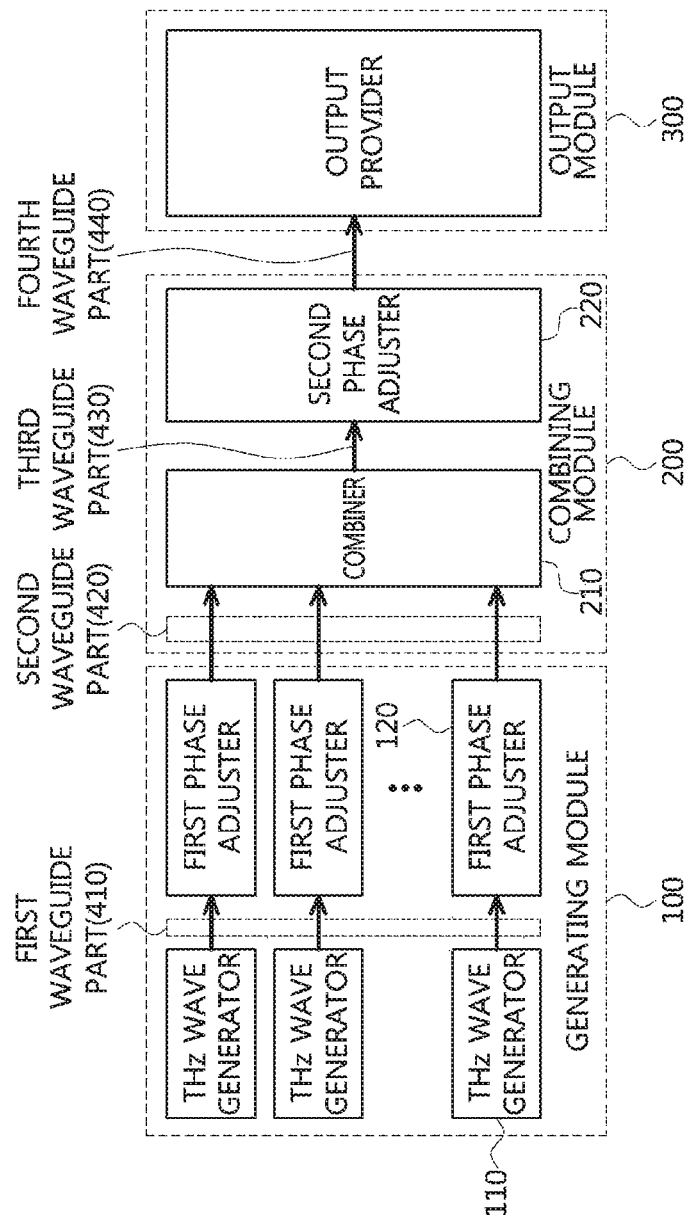
FIG. 2 is a detailed block diagram of a THz wave providing apparatus according to an embodiment of the present disclosure.

FIG. 2 is a detailed block diagram of a THz wave providing apparatus according to an embodiment of the present disclosure.

As already shown in FIG. 1, the THz wave providing apparatus according to an embodiment of the present disclosure may include the generating module 100, the combining module 200, and the output module 300. Also, as shown in FIG. 2, the THz wave providing apparatus may further comprise a first waveguide part 410, a second waveguide part 420, a third waveguide part 430, and a fourth waveguide part 440 which are respectively disposed in the generating module 100, the coupling module 200, and the output module 300.

The generating module 100 may include one or more THz wave generators as shown in FIG. 1, and each of the THz wave generators (e.g., 110) may generate THz waves independently or interactively.

Each of the at least one THz wave generator may be a device for generating a THz wave to be supplied to the system. For example, each of the at least one THz wave generator may include a laser beating light source, an amplifier, and a photomixer. The laser beating light source may generate at least one beam, and then output a laser beam by causing beating of the at least one laser beam. Also, the amplifier may amplify the output laser beam. The photomixer may be excited by the laser light to produce a pulse or continuous THz wave.

Here, the at least one THz wave generator may use a femtosecond pulsed laser. Since the femtosecond pulsed laser has a large intensity of light, a pulsed THz wave having a relatively large intensity may be generated in a wide frequency range. In a case of generating a continuous THz wave, laser lights of two wavelengths may be heated to be used as excitation light.

At least one first phase adjuster (e.g., 120) in the generating module 100 of FIG. 2 may adjust phases of the THz waves output from the at least one THz wave generator. The phase adjustment according to the at least one first phase adjuster may include a phase adjustment method through a conventional active phase adjustment technique that electrically adjusts characteristics such as electrical, thermal, optical, and physical path difference of a material. Also, it may use a phase adjustment method using a conventional passive phase adjustment technique which is intended to be fixed for a limited period of time.

The at least one first phase adjuster may be configured as at least one element integrated in the front or rear of the at least one THz wave generator or around the at least one THz wave generator, for example, on the upper, lower, side, or the like of the at least one THz wave generator or the waveguide part constituting the at least one generator. Also, the at least one first phase adjuster may be disposed in such a manner that the first phase adjuster 120 connected to the generator 110 through the first waveguide 410 as shown in FIG. 2.

The combining module 200 of FIG. 2 may be a component for substantially obtaining a desired output intensity distribution and phase distribution from THz waves obtained from the plurality of THz wave generators.

Here, the at least one THz wave generator may generate THz waves having high coherence, the at least one first phase adjuster 120 in the generating module 100 may primarily adjust phases thereof, and a second phase adjuster 220 in the combining module 200 may secondarily adjust their phases to determine the desired phase and intensity distribution.

The second phase adjuster 220 may be, for example, in a form of a diffuser that is processed in a manner such as etching or attaching in or to a combiner 210, and exposed in a form of concavo-convex. Also, the second phase adjuster 200 may be implemented as a form to which at least one of other conventional active and passive phase adjustment techniques is applied.

Here, electromagnetic, physical characteristics and shape of the combiner 210 may be designed by a holographic method, or may be implemented by applying a diffractive optical method, an array antenna design technique, or the like. Here, the combiner 210 may be included in a portion of the combining module 200 that explicitly includes the second waveguide part 420, the third waveguide part 430, and the fourth waveguide part 440. The combiner 210 may also be included in a section of the combining module 200 in which respective waveguides are not clearly distinct but perform respective functions.

An output provider of the output module 300 may be a final stage that emits a desired THz wave to the outside, and may have a form in which a waveguide, an antenna, a lens, and the like are combined. The output provider may be designed such that an optimal output can be obtained for the phase and intensity distributions of the combining module.

The components shown in FIG. 2 are shown as being arranged at the front or rear end in relation to other components for convenience of illustration, but this is only one embodiment. The arrangement of each component may be opposite to the embodiment shown in FIG. 2, or one component may be included as part of another component.

For example, the first waveguide part 410 of FIG. 2 may also be configured as a portion of the at least one THz wave generator, and may also be disposed at the rear end of the at least one THz wave generator (left of the at least one THz wave generator in FIG. 2), rather than between the at least one THz wave generator and the at least one first phase adjuster.

Also, for example, the combiner 210 in the combining module 200 may be included in the second waveguide part 420 and the third waveguide 430 part, may be a portion of the second waveguide part 420 and the third waveguide part 430, or may be connected to the second waveguide part 420 and the third waveguide 430 part.

As shown in the block diagram of FIG. 2, in an embodiment of the present disclosure, instead of using only the output obtained from a single semiconductor device, a cheap and small THz wave providing apparatus, which combines outputs obtained from two or more THz wave generators and outputs the combined THz wave, is provided.

Also, according to the embodiments of the present disclosure, even when a single THz wave generator is used, beam shape, intensity distribution, and phase distribution of the THz wave generated by the single THz wave generator can be adjusted or controlled in a desired form and the generated THz wave can be supplied to the corresponding system, for the purpose of efficient data acquisition, improvement of signal-to-noise ratio (SNR), scanning, focusing, and uniformity.

Figure 3:
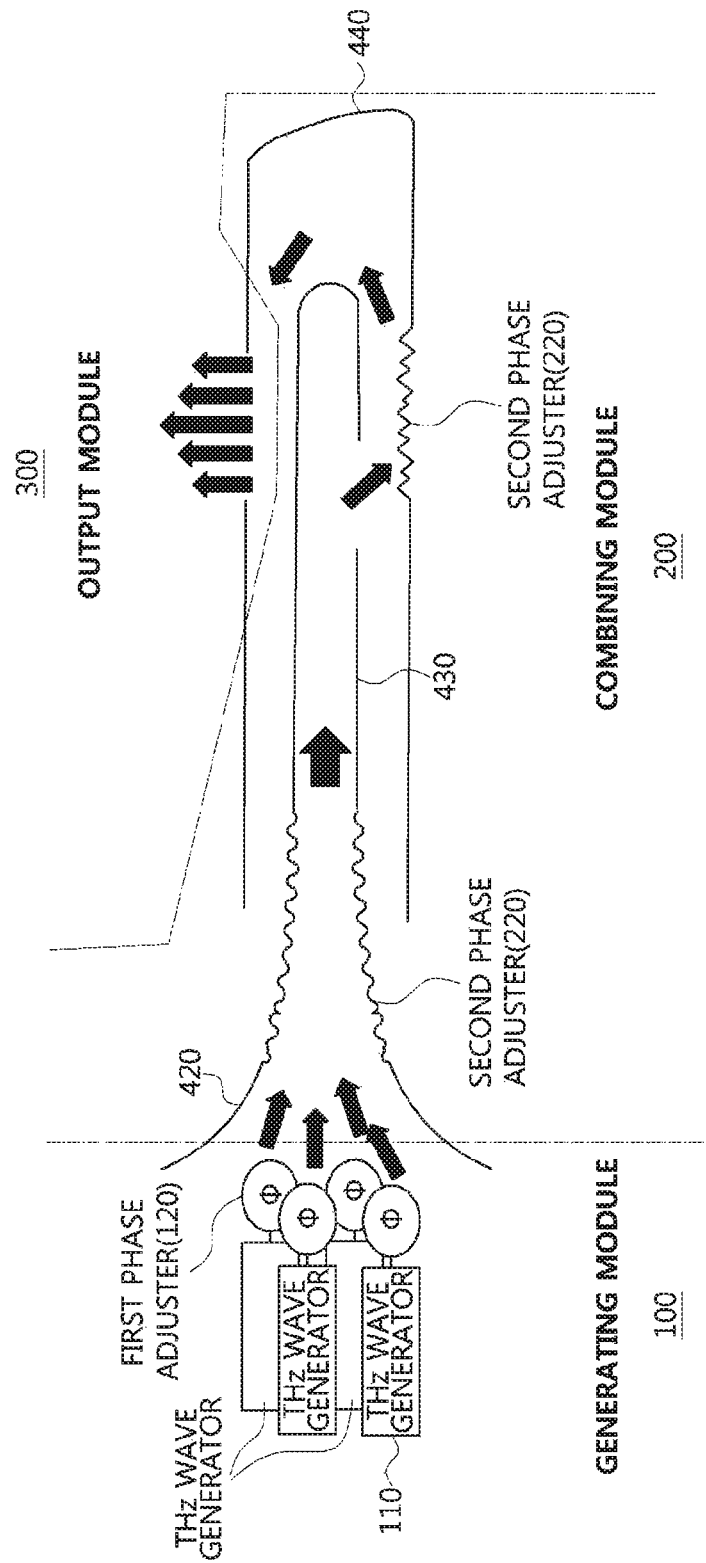
FIG. 3 is a structural diagram of a THz wave providing apparatus for performing output and phase adjustment combining according to an embodiment of the present disclosure.

FIG. 3 is a structural diagram of a THz wave providing apparatus for performing output and phase adjustment combining according to an embodiment of the present disclosure.

That is, FIG. 3 illustrates an embodiment of a THz wave providing apparatus for outputting a THz wave generated through at least one THz wave generator 110 having a form of a 2×2 array to an output module 300 through a combining module 200.

In the embodiment of FIG. 3, a first phase adjuster 120 capable of adjusting a phase of each of the THz wave generators is coupled to a front end of each of the THz wave generator, and a THz wave generated therefrom is radiated to the combining module 200. In this case, the combining module 200 may be in a form of a conventional horn antenna, may be in a form of other antennas, or may also take a form of a lens, a waveguide, a coupler, or the like.

In FIG. 3, the second waveguide part 420 in the combining module 200 may be located on the side receiving the THz waves, for example, the entrance side in the horn antenna configuration shown in FIG. 2. Also, the third waveguide part 430 and the fourth waveguide part 440 of the combining module 200 may have a form of a double-layered cylindrical concentric waveguide tube. Also, the third waveguide part 430 may include a plurality of waveguides for individually guiding the THz waves radiated from the THz wave generators 110. In this case, the third waveguide part 430 and the fourth waveguide part 440 may not have the same center.

As a material of the waveguide, a metal, a dielectric, an optical fiber, or the like may be used, but a metal waveguide may be usually used for the cylindrical waveguide shown in FIG. 3. The metal waveguide may be provided in various forms such as a parallel-plate, a rectangle, and a circular shape in addition to the cylindrical shape.

The second phase adjuster 220 in the combining module 200 may be located at a specific point in the waveguide part of the combining module 200 or dispersed throughout the waveguide part. The second phase adjuster 220 may perform an auxiliary role for making the THz wave have a desired form such as a Gaussian beam form or a line beam form, until the THz wave within the combining module 200 reaches the output module 300. Accordingly, the shape and structure of the second phase adjuster 220 may be designed and manufactured so that the optimal beam energy can be reached according to the shape and condition of the output module 300.

The output module 300 may be located at the end or side of the waveguide in the form of an antenna, a lens, or a window, and may serve as a final stage in which THz waves are combined and output in a desired form.

Figure 4:
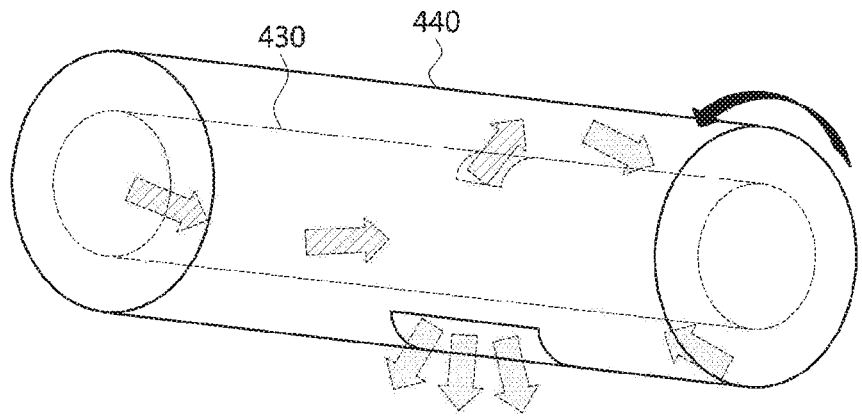
FIG. 4 is a structural diagram of a waveguide part in a THz wave providing apparatus according to an embodiment of the present disclosure.

FIG. 4 is a structural diagram of a waveguide part in a THz wave providing apparatus according to an embodiment of the present disclosure.

That is, FIG. 4 illustrates an embodiment of the structure of the third waveguide part 430 and the fourth waveguide part 440 among the waveguide parts in the THz wave providing apparatus. The third waveguide part 430 and the fourth waveguide part 440 may each have a shape of a cylindrical waveguide tube, and the centers of the two cylindrical waveguides may be the same. Differently from the embodiment of FIG. 4, the third waveguide part 430 and the fourth waveguide part 440 may have a shape in which a cross section of the waveguide is not circular, for example, a rectangular.

Also, the third waveguide part 430 may include a plurality of waveguides for individually guiding the THz waves radiated from the plurality of THz wave generators 110. In this case, the third waveguide part 430 and the fourth waveguide part 440 may not have the same center.

Also, as shown in FIG. 4, the fourth waveguide part 440 may include an output part through which the THz wave is finally output, and may be rotatable with a concentric rotation axis which is the same as that of the third waveguide part 430. The fourth waveguide part 440 may perform a rotational reciprocating motion or a unidirectional rotational motion within a desired angle. In other words, the fourth waveguide part 440 may be implemented so as to change the direction of the output beam simultaneously while outputting the beam having the desired profile through a mechanical operation such as the rotational motion. According to the purpose, the third waveguide part 430 may be also rotatable.

According to another embodiment which similar to the embodiment shown in FIG. 4, it may also be possible to change the direction of the output beam or to generate a beam scanning a certain range through mechanical and electrical variations of the at least one waveguide or phase adjuster. In this case, a coupling of the beam by the terahertz wave continuously passing through the dispersed or discrete phase adjuster is formed.

The phase adjuster (e.g., 110) of the generating module 100 may be used to adjust the phase of each THz wave generator so that the intensity, distribution, and phase of the beam output from the output module 300 are as close as possible to a desired shape.

The above-described embodiments are merely specific embodiments of a THz wave providing apparatus that performs THz wave output and phase adjustment combining. An apparatus that forms an optimum intensity distribution and phase distribution in an output module by applying one or more phase adjusters that are disposed distributively at one or more of the continuous wave propagation paths when combining outputs from a plurality of THz wave generators may be also included in the scope of the present disclosure.

The embodiments of the present disclosure may also include a method and apparatus for separating a THz wave output from a single THz wave generator into THz waves having a plurality of different paths through a phase adjuster which is disposed at a rear end or a front end of the THz wave generator and controls phases of the THz wave, and combining the THz waves.

Figure 5:
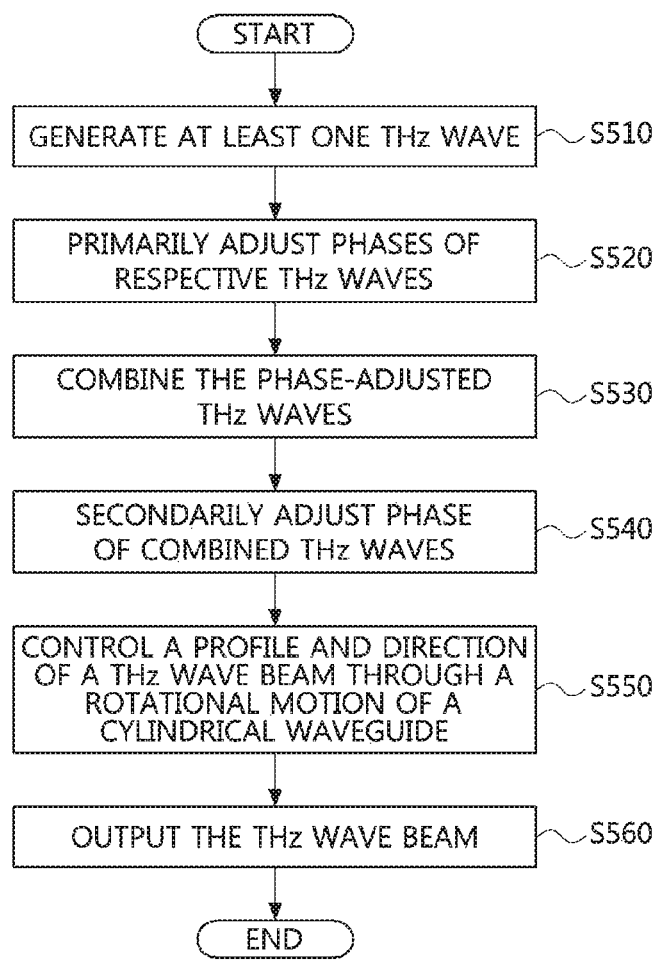
FIG. 5 is a flowchart for explaining a THz wave providing method according to an embodiment of the present disclosure.

FIG. 5 is a flowchart for explaining a THz wave providing method according to an embodiment of the present disclosure.

The THz wave providing method according to the present embodiment may be performed by the THz wave providing apparatus according to the present disclosure described above or the controller 500 described with reference to FIG. 1. However, the subject of operation of the method is not limited to these.

According to the THz wave providing method, at least one THz wave may be generated (S510), and the phases of the generated respective THz waves may be primarily adjusted (S520).

Thereafter, one or more waveguides and one or more phase adjusters may be used to receive and combine the phase-adjusted THz waves (S530), and to secondarily adjust the phase of the combined terahertz waves (S540) so as to adjust the intensity distribution and phase distribution of an output THz wave.

Thereafter, the profile and direction of the THz wave beam may be controlled through a rotational motion of the cylindrical waveguide (S550), and the adjusted THz wave beam may be output.

According to the above-described embodiments of the present disclosure, differently from the conventional method in which a plurality of THz waves inputted as having coherence at a specific one point or a certain section of a combiner are combined, a combined THz wave can be obtained in a desired form by continuously performing an input-stage phase adjustment and an internal-stage phase adjustment. Also, the above-described embodiments can be applied even when the output THz wave is used for spatial scanning.

With such the configuration, the present embodiments of the present disclosure can overcome the problem of the low output power, which is a disadvantage of the conventional THz wave generator, and can be used for imaging by acquiring a uniform beam. The embodiments of the present disclosure are also expected to be widely applicable to various THz wave applications by enabling output of a beam having a specific profile.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An apparatus providing an output terahertz (THz) wave, the apparatus comprising:
   at least one THz wave generator each of which generates a THz wave;
   at least one first phase adjuster adjusting a phase of each of the generated THz wave;
   at least one waveguide part receiving and combining the at least one phase-adjusted THz wave radiated from the at least one first phase adjuster, and guiding the combined THz wave;
   at least one second phase adjuster adjusting a phase of the combined THz wave from the at least one waveguide part, which is connected to the at least one waveguide part or disposed in a portion of the at least one waveguide part; and
   an output module outputting the combined THz wave guided from the at least one waveguide part as an output THz wave.

2. The apparatus according to claim 1, wherein output intensity distribution and phase distribution of the output THz wave are controlled by the at least one waveguide part and the at least one second phase adjuster.

3. The apparatus according to claim 1, wherein at least a portion of the at least one waveguide part is positioned on a horn antenna or a lens that receives the at least one phase-adjusted THz wave.

4. The apparatus according to claim 1, wherein the at least one second phase adjuster includes at least one unevenness formed by etching or attaching in the at least one waveguide part.

5. The apparatus according to claim 1, wherein the at least one waveguide part includes a first cylindrical waveguide and a second cylindrical waveguide surrounding the first cylindrical waveguide, and the first cylindrical waveguide and the second cylindrical waveguide have a same center.

6. The apparatus according to claim 5, wherein the first cylindrical waveguide includes at least one window to guide a THz wave guided via the first cylindrical waveguide to the second cylindrical waveguide through the window.

7. The apparatus according to claim 6, wherein the second cylindrical waveguide performs a rotational reciprocating motion or a unidirectional rotational motion within a certain angle.

8. The apparatus according to claim 1, wherein the output module includes at least one of an antenna, a lens, and an aperture to output the output THz wave in a form of a Gaussian beam or a line beam.

9. A method for providing an output terahertz (THz) wave beam, the method comprising:
   generating at least one THz wave;
   primarily adjusting a phase of each of the at least one THz wave;
   receiving and combining the at least one primarily phase-adjusted THz wave and secondarily adjusting a phase of the combined THz wave by using at least one waveguide part and at least one phase adjuster, so as to control phase distribution and output intensity distribution of the combined THz wave;
   controlling a profile and a direction of an output THz wave beam through a rotational motion of at least one waveguide included in the at least one waveguide part; and
   outputting the output THz wave beam.

10. The method according to claim 9, wherein the at least one waveguide part includes a first cylindrical waveguide and a second cylindrical waveguide surrounding the first cylindrical waveguide, and the first cylindrical waveguide and the second cylindrical waveguide have a same center.

11. The method according to claim 10, wherein the second cylindrical waveguide performs a rotational reciprocating motion or a unidirectional rotational motion within a certain angle.

* * * * *